Patented Feb. 9, 1943

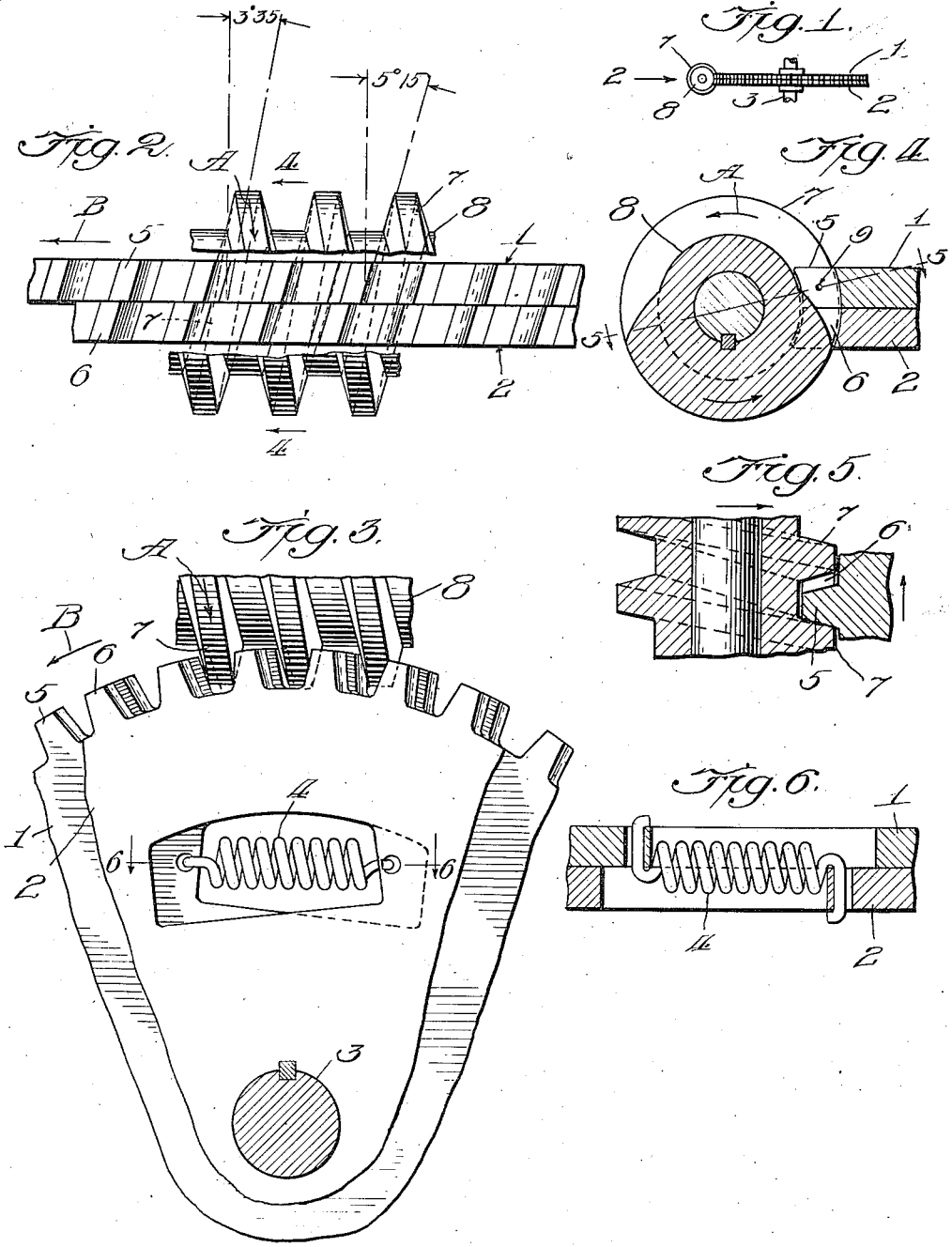

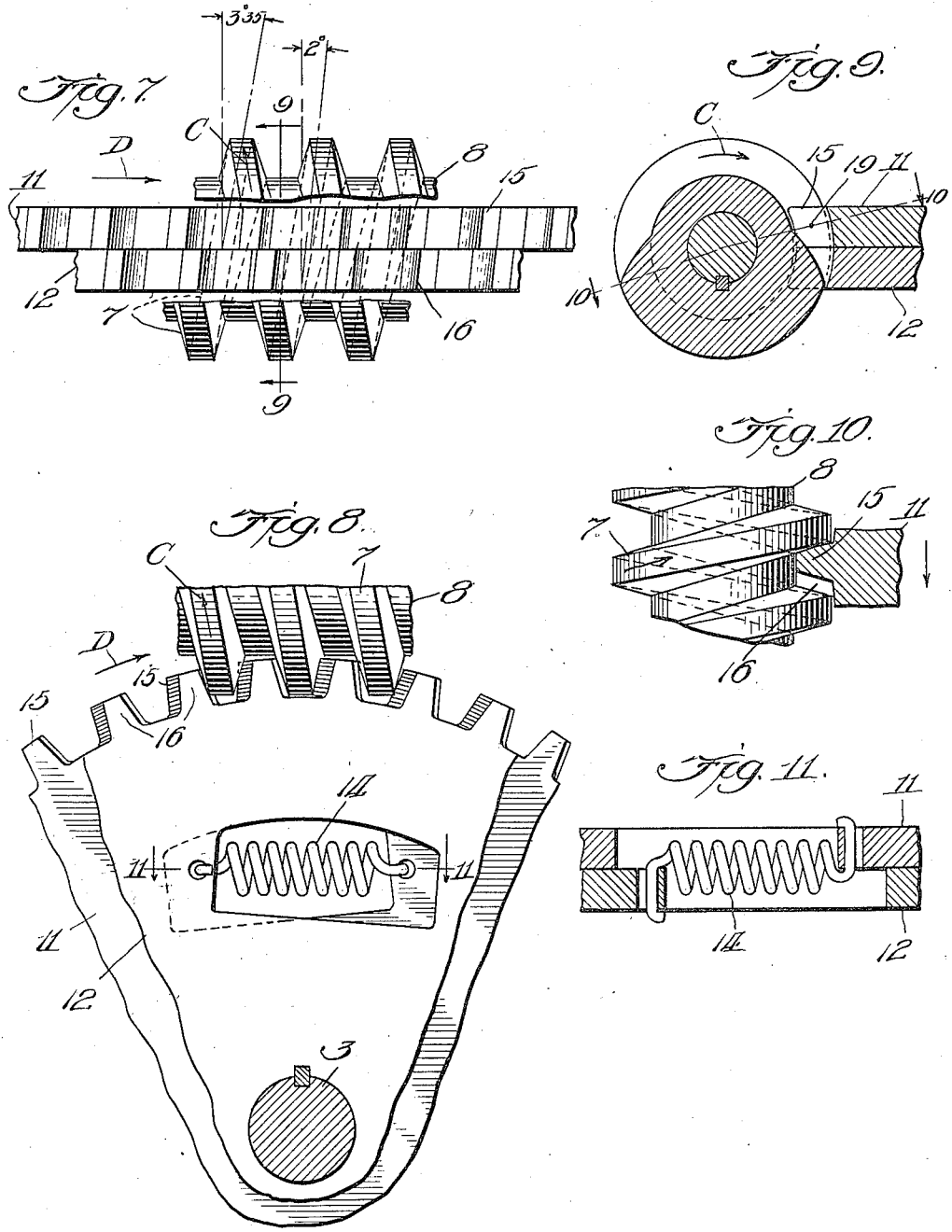

2,310,232

UNITED STATES PATENT OFFICE 2,310,232

PRELOADED GEARS

Charles B. Hale, Chicago, Ill., assignor to Gear Specialties, a copartnership composed of Herman B. Gardner, Elsie Marie Gardner, Elmer H. Johnson, Elsie M. Johnson, Conrad N. Petersen, and Jennie Petersen, all of Chicago, Ill.

Application December 12, 1941, Serial No. 422,606

7 Claims. (Cl. 74—440)

It is very important that there be no lost motion in worm gear drives in many of their fields of use. By that I mean that after a worm wheel has been turned in one direction, it be brought exactly to the starting point upon rotating the worm through exactly the same angular distance but in the reverse direction from the previous movement. This can only be accomplished by having the teeth on the worm wheel always in firm contact with both sides of the thread on the worm. This can most readily be accomplished by dividing the worm wheel into halves on a plane at right angles to the axis thereof, and connecting the two halves or sections together by means of a spring which will cause a tooth on one section to be pressed against one side of the worm thread, while a tooth on the other section is pressed against the opposite side of the thread; the thread being therefore yieldingly gripped between two consecutive teeth. This construction is open to the serious objection that the corners of the teeth on the worm wheel, adjacent to the plane of division, soon break off or are worn away; this being due to the fact that the area of contact between the thread and each tooth is at the middle of the tooth, where the tooth is cut in two and thus presents two corners to carry the load.

The object of the present invention is to overcome the aforesaid objection to a two-section gear wheel while securing adequate contact between the worm thread and the gear teeth.

Conceiving that if the point of contact between the worm thread and each half length tooth could be shifted away from the inner end, so as to be remote from both ends of the tooth, the area of pressure on the tooth always being surrounded by other portions of the tooth, the cause of failure in the ordinary loaded gear would be entirely eliminated, I set about to determine how this end could be attained. I discovered that by employing a different angle for the worm gear helix than for the worm helix, the point of contact between the worm thread and each half tooth could be shifted so as to lie between and at a distance from each end of the tooth, regardless of which of the two gear sections is receiving the thrust of the thread, and that a relation between such angles can be determined to bring the pressure area on each tooth midway between the ends of the latter. The difference between the angles of the thread and the teeth, measured in degrees, need not be great. The spring connecting the two half wheels may act in either of two directions. In other words, assuming that one wheel section is held stationary, the spring may tend to turn the other section either in the clockwise or in the counter-clockwise direction, depending upon the manner in which it is connected. The factors which determine the amount of angular deviation of the worm gear helix angle from the normal or worm helix angle as measured on the pitch diameter of the worm are: the pitch of the teeth and thread (circular or diametral); the number of teeth on the worm gear and of the threads on the worm; the width of the face of the worm gear; and, if the worm gear has a curved face, the pitch diameter of the hob with which the worm gear was cut. Furthermore, such deviation depends upon whether the aforesaid relative turning movements are in the clockwise or in the counter-clockwise direction. In other words, when the spring or springs act in such a direction that the teeth of the worm wheel are pressed against surfaces on the worm thread that make acute angles with the plane of division of the worm wheel, regardless of the direction of rotation of the worm, the helix angle of the teeth is less than the worm helix angle; whereas when the springs cause the teeth to press against surfaces on the worm thread that make obtuse angles with said plane, the worm wheel helix angle must be greater than that of the worm helix. Other conditions being equal, less deviation is required when the teeth have curved faces than when the faces are straight. It is therefore possible, knowing the essentials, in the case of any particular worm and worm wheel unit, to calculate or plot the required deviations in the helix angles of the teeth of the worm wheel when the latter is divided into two sections, as heretofore explained, and connected in either of the two possible ways, for limited relative rotation, by a spring or springs.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a more or less diagrammatic view of a cooperating worm and worm wheel embodying the present invention; Fig. 2 is a view, on a much larger scale than Fig. 1, showing the worm in elevation and a fragment of the worm wheel in edge elevation, the greater part of the worm being broken away to expose the edge of the wheel; Fig. 3 is a side view of a fragment of the worm wheel, together with a fragment of the worm; Fig. 4 is a section on line 4—4 of Fig. 2;

Fig. 5 is a section on line 5—5 of Fig. 4; Fig. 6 is a section on line 6—6 of Fig. 3; Figs. 7 and 8 are views similar to Figs. 2 and 3, respectively, showing the second of the two forms which this invention may take; Fig. 9 is a section on line 9—9 of Fig. 7; Fig. 10 is a section on line 10—10 of Fig. 9; and Fig. 11 is a section on line 11—11 of Fig. 8.

Referring to Figs. 1 to 6 of the drawings. 1 and 2 represent the two sections of a worm wheel divided along a central plane at right angles to its axis. One of the sections, namely the section 2, in the illustration, is fixed to the shaft 3, while the other section is free to turn relatively to the shaft. A strong spring 4 connects the two sections together in such a manner that, assuming the section 2 to be stationary, the spring tends constantly to turn the section 1 in the clockwise direction, as viewed in Fig. 3, relatively to the section 2. In the arrangement shown, the spring 4 is a simple coil spring connected at one end to one of the wheel sections and at the other end to the other wheel section. The parts are so proportioned that the section 1 must be turned somewhat in the counter-clockwise direction before the worm thread can be entered into the valley between consecutive teeth. This causes each thread in engagement with the teeth of the wheel to be gripped or clamped between a tooth on one wheel section and another tooth on the other wheel section. In this way the thread and the teeth are at all times held in firm contact with each other and, as wear takes place, this contact is maintained due to the constant pressure of the spring. The spring is, of course, made strong enough that it will not yield under the load imposed thereon when the shaft is driven by the wheel section that is loose on the shaft.

It will be seen that the teeth 5 on the loose wheel section are displaced toward the right in Figs. 2 and 3, relatively to the corresponding teeth 6 on the wheel section 2, which is fixed to the shaft. Consequently, the thread 7 on the worm 8 drives the composite wheel in one direction through the teeth 5 and in the other direction through the teeth 6. In the case of the arrangement just described, by making the worm wheel helix angle somewhat greater than the worm helix angle, the thread on the worm is caused to carry the points or lines of contact between the thread and the teeth between which it is clamped away from the plane of division of the compound wheel and to central planes in the two sections. As heretofore explained, the deviation of the worm wheel helix angle from the normal angle, namely that of the worm, depends upon various factors which, when known, permit the deviation to be accurately calculated. In the drawings the normal helix angle is assumed to be 3°3', the helix angle of the worm remaining at this value. However, the worm wheel helix angle must be substantially greater than normal and is found to be about 5°15', in the case of a worm wheel in which the ratio of the pitch diameter to the addendum is about sixteen to one and the ratio of the wheel thickness of each of the two sections to the addendum is about two to one.

It will be seen that when the worm is turned in the direction of the arrow A in Figs. 2 and 3, so as to rotate the worm wheel, the thrust of the thread is on the righthhand faces of the teeth 5 which are on the loose gear wheel. It will also be seen that the teeth 5 contact with that face of the thread which makes an obtuse angle with the plane of division between the two sections of the wheel. The center of pressure between the thread and a tooth which is being driven thereby is at the point 9 on the pitch diameter of the wheel, midway between the ends of the tooth, as shown in Fig. 4. As shown in Fig. 5, there may be a gap between the next thread and the opposite side of the tooth from that which the driving force is being applied; this gap representing the extent to which the teeth 5 and 6 are out of registration with each other.

When the direction of rotation of the worm is reversed, the thrust of the worm thread is applied to the teeth 6. In this case, also, the pressure is exerted by a face of the thread which makes an obtuse angle with the plane in which the two wheel sections meet. The worm thread of course remains in contact with the teeth 5, as shown in Fig. 5, during this reverse movement, but the driving is done through the teeth 6, a fragment of one of which is visible above the tooth 5 in Fig. 5. In this instance, also, the point of pressure between the worm thread and a tooth on the worm wheel is midway between the ends of that tooth.

Since the thrust of the worm thread against the gear teeth, regardless of the direction in which the worm is turned, is through a face of the thread that slopes forwardly and toward the near outer side of the gear wheel, there is created a thrust tending to spread the two wheel sections apart. This characteristic may be objectionable in some fields of use. I have found that this objection may be overcome by the simple expedient of reversing the connections between the spring and the two wheel sections so that, instead of tending to turn the section 1 in the clockwise direction, with respect to the other, the force is exerted to produce a counter-clockwise movement. This construction is shown in Figs. 7 to 11.

The device shown in Figs. 7 to 11 is one based on the same worm and worm wheel as in Figs. 2 to 6, in that the normal helix angles are 3°35'. Therefore, the worm illustrated is the same in both constructions. The worm wheel sections 11 and 12 in Figs. 7 to 11 differ from sections 1 and 2 only in that the helix angle of the teeth 15 and 16 is less than the normal helix angle, so that, as can best be seen from Fig. 7, the thrust between the thread and a tooth, regardless of the direction in which the worm is turned, is always against a face of the thread which makes an acute angle with the dividing plane between the two wheel sections. The result of this is that the component of the driving force that is parallel to the axis of the worm wheel acts in a direction tending to press the two wheel sections together instead of spreading them. I have found that in the particular example given, the helix angle of the worm wheel should be about 2° in order to cause the thread to engage the teeth midway between the ends of the latter.

It will be seen that the spring 14, which may be like the spring 4 except that it is reversely connected, tends to shift the gear teeth 15 in the counter-clockwise direction with respect to the teeth 16 on the wheel section 12. Therefore, when the worm is placed with its thread in mesh with the teeth of the worm wheel, the face which engages the teeth 5 in Fig. 3 now engages the teeth 16 in Fig. 8. A comparison of Figs. 5 and 10 illustrates the difference in the conditions existing in the two forms of the device. Whereas the tooth 5 engages the face of the thread immediately below it in Fig. 5, the corresponding tooth 15 engages the face of the thread overlying the same in Fig. 10. In other words, in order to drive through the teeth 15, which correspond to the teeth 5 in the other form, the worm must be turned in the opposite direction from that indicated by the arrow A in Fig. 2, namely in the direction of the arrow C in Figs. 7, 8 and 9. In that event the worm wheel turns in the direction of the arrow D in the latter figures of the drawings.

It will, of course, be understood that any desired number and kinds of springs may be employed to connect the two wheel sections together and that the connections may be made in any desired way.

It will thus be seen that I have invented a simple and novel way of preventing any lost motion between the thread of a worm and the teeth of a complementary worm wheel, both initially and after long use, by causing the contact points between thread and teeth to be displaced away from the ends of the teeth on both sections of the divided wheel; the shifting of the contact points away from the plane of division in the wheel insuring that the effect of such wear as occurs is entirely nullified by the automatic take up.

While I have illustrated and described with particularity only a specific embodiment of each of the two general forms which my invention may take, I do not desire to be limited to the exact structural details thus illustrated and described; but intend to cover all forms and arrangements which come within the definitions of my invention constituting the appended claims.

I claim:

1. In a worm drive comprising a worm and a worm wheel, said wheel being divided into two sections on a plane containing the axis of the worm, and spring means connecting said sections together and tending constantly to hold them displaced somewhat angularly of each other, the helix angles of the worm and the wheel being unequal to such an extent that the worm thread contacts with the teeth of each wheel section only at points remote from said plane.

2. In a worm drive comprising a worm and a worm wheel, said wheel being divided into two sections on a plane containing the axis of the worm, and spring means connecting said sections together and tending constantly to hold them displaced somewhat angularly of each other, the helix angles of the worm and the wheel being unequal to such an extent that the worm thread contacts with the teeth of each wheel section only at points about midway between the ends thereof.

3. In a worm drive comprising a worm and a worm wheel, said wheel being divided into two sections on a plane containing the axis of the worm, and spring means connecting said sections together and tending constantly to hold them displaced somewhat angularly of each other, the helix angle of the wheel being substantially greater than that of the worm when the spring means is designed to act on the wheel sections in a manner to press the gear teeth on opposite sides of a worm thread against surfaces on that thread that make obtuse angles with said plane.

4. In a worm drive comprising a worm and a worm wheel, said wheel being divided into two sections on a plane containing the axis of the worm, and spring means connecting said sections together and tending constantly to hold them displaced somewhat angularly of each other, the helix angle of the wheel being substantially less than that of the worm when the spring means is designed to act on the wheel sections in a manner to press the gear teeth on opposite sides of a worm thread against surfaces on that thread that make acute angles with said plane.

5. In a worm drive comprising a worm and a worm wheel, said wheel being divided into two sections on a plane containing the axis of the worm, and spring means connecting said sections together and tending constantly to hold them displaced somewhat angularly of each other, the helix angle of the wheel being substantially less or greater than that of the worm according to whether the spring means acts on the wheel sections in a manner to press the gear teeth on opposite sides of a worm thread against surfaces on that thread that make acute angles with said plane or surfaces that makes obtuse angles with said plane.

6. In a worm drive comprising a worm and a worm wheel in which the ratio of the pitch diameter to the addendum is about sixteen to one and the ratio of the wheel thickness to the addendum is about four to one, said wheel being divided into two sections on a plane containing the axis of the worm, and spring means connecting said sections together and tending constantly to hold them displaced somewhat angularly of each other, the helix angle of the wheel being approximately 5°15' for a worm helix angle of approximately 3°35'.

7. In a worm drive comprising a worm and a worm wheel in which the ratio of the pitch diameter to the addendum is about sixteen to one and the ratio of the wheel thickness to the addendum is about four to one, said wheel being divided into two sections on a plane containing the axis of the worm, and spring means connecting said sections together and tending constantly to hold them displaced somewhat angularly of each other, the helix angle of the wheel being approximately 2° for a worm helix angle of approximately 3°35' when the spring means acts on the wheel sections in a manner to press the gear teeth on opposite sides of a worm thread against surfaces on that thread that make acute angles with said plane.

CHARLES B. HALE.